United States Patent
Narita et al.

(10) Patent No.: US 9,382,336 B2
(45) Date of Patent: Jul. 5, 2016

(54) METHOD FOR PREPARING CELLULOSE ETHER HAVING LOW DEGREE OF POLYMERIZATION AND CELLULOSE ETHER PREPARED THEREBY

(71) Applicant: Shin-Etsu Chemical Co., Ltd., Tokyo (JP)

(72) Inventors: Mitsuo Narita, Niigata-ken (JP); Yuichi Nishiyama, Niigata-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 14/150,793

(22) Filed: Jan. 9, 2014

(65) Prior Publication Data
US 2014/0194618 A1 Jul. 10, 2014

(30) Foreign Application Priority Data
Jan. 9, 2013 (JP) ................... 2013-002076

(51) Int. Cl.
| C08B 1/08 | (2006.01) |
| C08B 1/06 | (2006.01) |
| C08B 11/00 | (2006.01) |
| C08B 11/08 | (2006.01) |
| C08B 11/20 | (2006.01) |
| C08B 11/02 | (2006.01) |

(52) U.S. Cl.
CPC . C08B 11/08 (2013.01); C08B 1/06 (2013.01); C08B 1/08 (2013.01); C08B 11/02 (2013.01); C08B 11/20 (2013.01)

(58) Field of Classification Search
CPC ............ C08B 1/08; C08B 1/06; C08B 11/00; C08B 11/08; C08B 11/20
USPC .................................. 536/124, 84
See application file for complete search history.

(56) References Cited

U.S. PATENT DOCUMENTS

| 4,061,859 A | 12/1977 | Cheng |
| 6,306,333 B1 | 10/2001 | Rosenberg et al. |
| 6,939,961 B1 * | 9/2005 | Schlesiger ............ C08B 11/193 536/1.11 |
| 8,920,554 B2 * | 12/2014 | Mallon ................... C08B 11/20 106/172.1 |
| 2001/0007028 A1 | 7/2001 | Schulz |
| 2009/0176277 A1 | 7/2009 | Hayakawa et al. |
| 2010/0065390 A1 | 3/2010 | Boyd et al. |
| 2012/0214981 A1 | 8/2012 | Narita |

FOREIGN PATENT DOCUMENTS

| CN | 1353720 A | 6/2002 |
| CN | 101001881 A | 7/2007 |
| CN | 102399294 A | 4/2012 |
| CN | 102643352 A | 8/2012 |
| EP | 1 878 752 A1 | 1/2008 |
| EP | 2 428 523 A1 | 3/2012 |
| EP | 2 489 681 A1 | 8/2012 |
| JP | 08301901 A * | 11/1996 |
| JP | 2001-002701 A | 1/2001 |
| JP | 2002-531594 A | 9/2002 |
| JP | 2003-503557 A | 1/2003 |
| JP | 2005-239845 A | 9/2005 |
| WO | WO 00/32637 A1 | 6/2000 |
| WO | WO 01/00680 A1 | 1/2001 |
| WO | WO 2009/061815 A1 | 5/2009 |

OTHER PUBLICATIONS

European Search Report for Application No. EP 14 15 0511 dated Apr. 3, 2014.
Office Action for Chinese Application No. 201410007210.3 dated Jul. 31, 2015.

* cited by examiner

*Primary Examiner* — Patrick Lewis
*Assistant Examiner* — Everett White
(74) *Attorney, Agent, or Firm* — Alston & Bird LLP

(57) ABSTRACT

Provided is a method for preparing a cellulose ether having a low degree of polymerization and undergoing less yellowing and a cellulose ether prepared thereby. Specifically, provided is a method for preparing a cellulose ether having a low degree of polymerization, the method including a step of bringing pulp and an alkali metal hydroxide solution into contact with each other or mixing them to obtain a corresponding alkali cellulose, a first depolymerization step of reacting the alkali cellulose with oxygen to adjust a viscosity reduction percentage of the alkali cellulose to from 10 to 95%, a step of reacting the depolymerized alkali cellulose with an etherifying agent, a step of washing and drying the reaction product to obtain a cellulose ether, and a second depolymerization step of bringing the cellulose ether into contact with hydrochloric acid to adjust a viscosity reduction percentage of the cellulose ether from 40 to 99.9%.

4 Claims, No Drawings

METHOD FOR PREPARING CELLULOSE ETHER HAVING LOW DEGREE OF POLYMERIZATION AND CELLULOSE ETHER PREPARED THEREBY

FIELD

The present invention relates to a method for preparing a cellulose ether having a low degree of polymerization to be used for coating of tablets or the like and a cellulose ether prepared by this method.

BACKGROUND

Problems often found in a cellulose ether having a low degree of polymerization are yellowing and discoloration. Such yellowing or discoloration is also found in a composition containing the cellulose ether. Yellowing or discoloration can easily be observed in transparent pharmaceutical capsules and white food compositions.

There has been a demand for a method for preparing a cellulose ether having a low degree of polymerization, the cellulose ether having a low degree of yellowing or discoloration or free from yellowing or discoloration. There has also been a demand for pharmaceutical capsules and food using such a cellulose ether having a low degree of polymerization.

As the methods of decreasing the degree of polymerization of a cellulose ether, there has been proposed, as well as a method of depolymerizing a cellulose ether with hydrochloric acid as shown in the Japanese Phase Publication No. 2002-531594 of WO 00/32637, the Japanese Phase Publication No. 2003-503557 of WO 01/000680, or JP 2005-239845A, a method for preparing a cellulose ether comprising a step of bringing cellulose and an alkali metal hydroxide solution into contact with each other to obtain a corresponding alkali cellulose and then reacting the resulting alkali cellulose with oxygen for depolymerization as shown in JP 2001-002701A.

SUMMARY

With the foregoing in view, the invention has been made. An object of the invention is to provide a method for preparing a cellulose ether having a low degree of polymerization and undergoing less yellowing, and a cellulose ether prepared by this method.

The inventors have carried out an extensive investigation with a view to achieving the above-mentioned object. As a result, it has been found that a cellulose ether having a low degree of polymerization and undergoing less yellowing can be obtained by adjusting a viscosity reduction percentage in a first depolymerization through a reaction between an alkali cellulose and oxygen and a viscosity reduction percentage in a second depolymerization through a reaction between the cellulose ether thus obtained and an acid to fall within predetermined ranges, respectively, leading to completion of the invention. The depolymerization through the reaction between an alkali cellulose and oxygen and the depolymerization through the reaction between the resulting cellulose ether and an acid are conducted at the same time for the first time in the present invention.

More specifically, provided is a method for preparing a cellulose ether having a low degree of polymerization, comprising a step of bringing pulp and an alkali metal hydroxide solution into contact with each other or mixing them to obtain a corresponding alkali cellulose, a first depolymerization step of reacting the resulting alkali cellulose with oxygen to adjust a viscosity reduction percentage of the alkali cellulose to from 10 to 95% to obtain a depolymerized alkali cellulose, a step of reacting the depolymerized alkali cellulose with an etherifying agent to obtain a reaction product, a step of washing and drying the reaction product to obtain a cellulose ether, and a second depolymerization step of bringing the resulting cellulose ether into contact with hydrochloric acid to adjust a viscosity reduction percentage of the cellulose ether to from 40 to 99.9%.

According to the invention, a cellulose ether having a low degree of polymerization and undergoing less yellowing can be prepared. The resulting cellulose ether having a low degree of polymerization and undergoing less yellowing is useful for transparent pharmaceutical capsules, white food compositions and the like.

DETAILED DESCRIPTION

The cellulose ether to be used in the invention is cellulose having water solubility improved by a substituent introduced therein. Specific examples include water-soluble cellulose ethers such as nonionic cellulose ethers and ionic cellulose ethers. The nonionic cellulose ethers include alkyl celluloses such as methyl cellulose and ethyl cellulose; hydroxyalkyl celluloses such as hydroxyethyl cellulose and hydroxypropyl cellulose; and hydroxyalkylalkyl celluloses such as hydroxyethylmethyl cellulose, hydroxyethylethyl cellulose, hydroxypropylmethyl cellulose and hydroxypropylethyl cellulose. The ionic cellulose ethers include carboxymethyl cellulose.

The cellulose ether is preferably selected from the group consisting of alkyl celluloses, hydroxyalkyl celluloses and hydroxyalkylalkyl celluloses, of which hydroxyalkylalkyl celluloses are more preferred and hydroxypropylmethyl cellulose is particularly preferred.

The cellulose ether having a low degree of polymerization prepared according to the method of the present invention may be subjected to esterification to form a cellulose ether ester having a low degree of polymerization such as a cellulose ether phthalate, a cellulose ether acetate phthalate, and cellulose ether acetate succinate.

Examples of a method for obtaining an alkali cellulose include a method of spraying or adding dropwise an alkali metal hydroxide solution to a pulp powder which is being stirred; a method of immersing a pulp sheet in an excess alkali metal hydroxide solution to allow the pulp sheet to absorb a sufficient amount of the alkali metal hydroxide solution and then pressing it under pressure to remove the excess alkali metal hydroxide, thereby obtaining an alkali cellulose containing a predetermined amount of the alkali metal hydroxide; and a method of continuously bringing pulp chips into contact with an alkali metal hydroxide solution in a rotary feeder type contactor, a screw conveyor type contactor or the like and then draining the resulting product.

In the method of spraying or adding dropwise an alkali metal hydroxide solution to a pulp powder which is being stirred, an oxygen amount in a reactor is preferably as small as possible prior to the preparation of an alkali cellulose. It is preferably 1 g or less, more preferably 0.1 g or less per kg of a solid component in the pulp. The solid component in the pulp as used herein comprises cellulose as a main component; organic matters such as hemicellulose, lignin and resin; and inorganic matters such as Si and Fe. The concentration of the solid component in the pulp is measured by collecting about 2 g of pulp and drying it for 2 hours at 105° C. The solid concentration is expressed by % by weight which is calculated by dividing the dry weight by the collected pulp weight.

The oxygen amount prior to the preparation of an alkali cellulose can be adjusted before, after, or during introduction of the pulp into the reactor.

A method of adjusting the oxygen amount includes, but not particularly limited to, a method of removing a gas from the reactor and then filling the reactor again with an oxygen-free gas such as a nitrogen gas or helium gas; and a method of replacing the gas with an oxygen-free gas while feeding the oxygen-free gas to the reactor. The oxygen amount can be readily calculated based on the gas law when the kind of the gas in the reactor before adjustment, a space volume in the reactor, an atmospheric pressure, gas temperature and the like are known. The oxygen amount in the reactor thus calculated is desirably adjusted to 1 g or less per kg of the solid component in the pulp.

As a vessel in which the alkali metal hydroxide solution is sprayed or added dropwise to a pulp powder which is being stirred, a vessel having a stirring structure therein and capable of containing an alkali cellulose therein can be used.

The alkali metal hydroxide solution to be used is not particularly limited insofar as an alkali cellulose can be obtained from it. It is preferably an aqueous solution of sodium hydroxide or potassium hydroxide, with sodium hydroxide being particularly preferred from the economic viewpoint. The concentration of the alkali metal hydroxide solution is preferably from 23 to 60% by weight, more preferably from 35 to 55% by weight. When the concentration is less than 23% by weight, it may be economically disadvantageous because in a later step for obtaining a cellulose ether, a side reaction occurs between an etherifying agent and water; the obtained cellulose ether may not have a desired degree of substitution; and an aqueous solution of the obtained cellulose ether may be inferior in transparency. When the concentration is more than 60% by weight, the viscosity of the solution may increase so that it may become difficult to handle the solution. It should be noted that the concentration of the alkali metal hydroxide solution to be provided for contact with the pulp is preferably kept at constant in order to stabilize the composition of the alkali cellulose and ensure the transparency of the cellulose ether.

A weight ratio of the alkali metal hydroxide contained in the alkali cellulose thus obtained to the solid component in the pulp (a weight ratio of alkali metal hydroxide/solid component in pulp) is preferably from 0.3 to 1.5, more preferably from 0.65 to 1.30, still more preferably from 0.90 to 1.30. When the weight ratio is from 0.3 to 1.5, the cellulose ether thus obtained has enhanced transparency.

The first depolymerization step by oxygen supply is conducted next, preferably during or after addition of the alkali metal hydroxide solution.

In the method of spraying or adding dropwise an alkali metal hydroxide solution to a pulp powder which is stirred, oxygen is supplied continuously or intermittently during the addition of the alkali metal hydroxide solution or after completion of the addition of the alkali metal hydroxide solution. It is preferred to supply oxygen after addition of a larger portion of the alkali metal hydroxide solution to be added, for example, after addition of one third or more of the amount of the alkali metal hydroxide solution, particularly after the whole amount of the alkali metal hydroxide solution is added. When the oxygen is supplied after addition of a larger portion of the alkali metal hydroxide solution to be added, a distribution of the alkali metal hydroxide solution on the pulp becomes more uniform with an increase in the amount of the alkali metal hydroxide solution added so that the depolymerization reaction proceeds more uniformly. Oxygen may be supplied several minutes or tens of minutes after the addition of the whole amount of the alkali metal hydroxide solution.

Oxygen can be supplied using an oxygen gas or an oxygen-containing gas such as air. The air is preferably used because it is inexpensive and highly safe.

Oxygen can be supplied by a method including a method of injecting an oxygen gas or an oxygen-containing gas in a reactor; a method of removing a gas once from a reactor and then filling the reactor with an oxygen-containing gas; and a method of providing a reactor with valves at respectively different positions and supplying an oxygen-containing gas through one of the valves, while removing a gas from the reactor through the other of the valves. In the method of providing valves at respectively different positions, an oxygen gas or an oxygen-containing gas is transferred, for example, by supplying the gas as a compressed gas, removing or supplying the gas through an exhauster, or removing the gas through a vacuum pump.

The supply amount of oxygen varies, depending on the degree of polymerization of pulp, an intended viscosity of a cellulose ether, a depolymerization temperature of alkali cellulose with oxygen, a depolymerization reaction time, and an amount of oxygen already present in the reactor before oxygen supply. In general, however, the supply amount is preferably 0.1 g or greater, more preferably 0.5 g or greater per kg of the solid component in the pulp.

In the first depolymerization of the alkali cellulose with oxygen, a depolymerization catalyst may be optionally added. Examples of the depolymerization catalyst include cobalt chloride and benzenediazonium hydroxide. An amount of the catalyst is preferably 3 mg or less per kg of the solid component in the pulp. The depolymerization catalyst added in an amount of more than 3 mg has almost no improving effect and therefore deteriorates the cost effect.

The preparation and depolymerization reaction of the alkali cellulose are preferably conducted while stirring sufficiently. This makes it possible to uniformly distribute the alkali metal hydroxide solution, oxygen gas or oxygen-containing gas, and heat into the pulp, thereby obtaining the advantageous result of the invention.

The reaction temperature of the first depolymerization of the alkali cellulose with oxygen is preferably from 20 to 100° C., more preferably from 30 to 90° C., still more preferably from 40 to 90° C. The reaction time of the depolymerization of the alkali cellulose with oxygen is typically from 5 minutes to 2 hours, though depending on the temperature.

A viscosity reduction percentage through the depolymerization reaction of the alkali cellulose with oxygen is preferably from 10 to 95%. The term "viscosity reduction percentage" as used herein can be determined by the following equation:

$$\text{viscosity reduction percentage (\%)} = \{1-(V_1/V_0)\} \times 100$$

wherein $V_0$ (mPa·s) represents a viscosity at 20° C. of an aqueous 2% by weight solution of a cellulose ether obtained without a depolymerization reaction with oxygen, while $V_1$ (mPa·s) represents a viscosity at 20° C. of an aqueous 2% by weight solution of a cellulose ether prepared in the same manner except for conducting a depolymerization reaction with oxygen.

The viscosity of the cellulose ether obtained by the depolymerization reaction of the alkali cellulose with oxygen (viscosity before the depolymerization reaction with acid) is, in terms of a viscosity at 20° C. of an aqueous 2% by weight solution, preferably from 30 to 10000 mPa·s, more preferably from 100 to 8000 mPa·s, still more preferably from 300 to 4000 mPa·s. When the viscosity is less than 30 mPa·s, a washing loss in a washing step may increase or worsen the yellowness. When the viscosity is more than 10000 mPa·s, the advantageous result of the invention may not be obtained.

After preparation and depolymerization reaction of the alkali cellulose are completed, the alkali cellulose and an etherifying agent are reacted in a typical manner to etherify the alkali cellulose. Although the etherifying agent varies depending on the kind of a cellulose ether to be prepared, examples include methyl chloride and propylene oxide.

The reaction product between the alkali cellulose and the etherifying agent is washed and then dried to obtain a corresponding cellulose ether. As for washing, washing with water (preferably hot water of from 60° C. to 100° C.), or washing with an organic solvent or a mixture of an organic solvent and water is usually employed. For example, the reaction product transferred to a washing machine is filtered into a cake, sprayed with hot water, and filtered again to complete washing.

The reaction product thus washed is optionally compressed. For compressing, a continuous compressor is preferably used. A compressing system of the continuous compressor is not particularly limited insofar as the compressor can compress the cake continuously.

The reaction product after washing or after optional compressing is dried. It can be dried, for example, by hot air drying, conduction heating, or a combination thereof.

The cellulose ether thus dried is optionally pulverized.

A pulverization method is not particularly limited. Any pulverization system can be used including an impact pulverization device for pulverization through collision each other or collision against a collision medium; and a ball mill or a roller mill for pulverization through insertion between grinding media.

When the weight average particle size as measured using a sieve analysis is preferably 500 μm or less, pulverization may be omitted. It is because when the weight average particle size as measured using a sieve analysis before the pulverization is preferably 500 μm or less, more preferably from 100 to 500 μm, the cellulose ether can be depolymerized with an acid without the pulverization.

When the cellulose ether has a weight average particle size of more than 500 μm as measured by a sieve analysis, it is preferably pulverized. Although there is a problem that a too large particle size prevents smooth progress of depolymerization, there is a preferable advantage that depolymerization before pulverization weakens a bonding property of the molecules of the cellulose ether caused by their entanglement, facilitates the subsequent pulverization, and reduces heat generated by the pulverization, thereby preventing the cellulose ether from being colorized through modification or becoming insoluble in water. The depolymerization before pulverization is thus preferred for obtaining the advantageous effects of the invention. When the cellulose ether after the pulverization is to be used for depolymerization, the cellulose ether power obtained by the pulverization preferably has a weight average particle size of preferably 100 μm or less, more preferably from 40 to 100 μm as measured by a sieve analysis in view of achieving the advantageous effects of the invention without retarding the dissolution rate in water.

The cellulose ether which has been subjected to washing, drying and optional pulverization is then subjected to the second depolymerization. The viscosity at 20° C. of an aqueous 2% by weight solution of the cellulose ether before the second depolymerization is from 30 to 10000 mPa·s. When the viscosity before the second depolymerization is less than 30 mPa·s, the cellulose ether will worsen yellowness. When the viscosity is more than 10000 mPa·s, the advantage of the invention cannot be obtained.

A method for controlling the viscosity during depolymerization includes a method of changing a reaction rate and a method of changing a reaction time, depending on the reaction temperature or an amount of an acid to be added. Considering ease of control and shortening of the reaction time, a method of changing their concentrations is usually employed.

An acid catalyst which can donate a proton in the form of an aqueous acid catalyst solution can be used irrespective of whether it is a gas or a liquid, or irrespective of the condition or kind of the solution. In general, a hydrogen chloride gas or an aqueous solution or alcohol solution thereof can be used. The aqueous solution of hydrogen chloride may have a concentration of preferably from 1 to 45% by weight, more preferably from 5 to 40% by weight.

Regarding the amount of the acid catalyst, for example, hydrogen chloride is used preferably in an amount of from 0.04 to 1 part by weight, more preferably from 0.1 to 0.6 parts by weight relatively to 100 parts by weight of the raw material cellulose ether. When the amount of the hydrogen chloride is less than 0.04 parts by weight, the reaction rate may be low and it may take long hours to complete the reaction. When the amount of the hydrogen chloride is more than 1 part by weight, the reaction may not be controlled easily and not only it may take time to remove the catalyst but also a large amount of the catalyst tends to remain in the product as an impurity.

When the acid catalyst is used, in order to control the reaction rate properly, the reaction temperature is preferably from 40 to 85° C. and the reaction time is preferably from 0.1 to 4 hours.

When hydrolysis with the acid occurs, the acid is preferably removed by deaeration after the reaction. If the remaining acid cannot be removed completely by deaeration, it may be neutralized, for example, by mixing with weak alkali powder such as sodium bicarbonate.

A viscosity reduction percentage in the second depolymerization reaction with the acid is preferably from 40 to 99.9%. The term "viscosity reduction percentage" as used herein can be expressed by the following equation:

$$\text{viscosity reduction percentage (\%)} = \{1-(V_2/V_0)\} \times 100$$

wherein $V_0$ (mPa·s) represents a viscosity at 20° C. of an aqueous 2% by weight solution of a cellulose ether obtained without a depolymerization reaction with an acid and $V_2$ (mPa·s) represents a viscosity at 20° C. of an aqueous 2% by weight solution of a cellulose ether obtained in the same manner except for conducting a depolymerization reaction with an acid.

In the present invention, a cellulose ether having a low degree of polymerization and undergoing less yellowing is prepared by conducting both of the first depolymerization through a reaction between an alkali cellulose and oxygen and the second depolymerization of the resulting cellulose ether with hydrochloric acid and adjusting a ratio of the above-mentioned viscosity reduction percentages to a predetermined range.

A ratio of the viscosity reduction percentage by the first depolymerization through the reaction between the alkali cellulose and oxygen to the viscosity reduction percentage by the second depolymerization with hydrochloric acid can be calculated according to the following equation:

$$\text{ratio of viscosity reduction percentages} = \{1-(V_2/V_1)\}/\{1-(V_1/V_0)\}$$

wherein $V_0$ (mPa·s) represents the viscosity at 20° C. of an aqueous 2% by weight solution of a cellulose ether obtained by conducting neither the first depolymerization reaction of an alkali cellulose with oxygen nor the second depolymerization reaction of a cellulose ether with an acid; $V_1$ (mPa·s) represents the viscosity at 20° C. of an aqueous 2% by weight solution of the cellulose ether after the first depolymerization reaction of an alkali cellulose with oxygen; and $V_2$ (mPa·s) represents the viscosity at 20° C. of an aqueous 2% by weight solution of the cellulose ether after the second depolymerization reaction with an acid.

According to the invention, the ratio of viscosity reduction percentages is preferably from 0.7 to 8.0, more preferably from 0.9 to 4.0.

When the ratio of viscosity reduction percentages is less than 0.7, the viscosity reduction percentage through the reaction of an alkali cellulose with oxygen may be high. Yellow products are generated in both the first depolymerization step through the reaction between an alkali cellulose and oxygen and the second depolymerization step of the resulting cellulose ether with an acid, but most of the yellow products generated through the reaction between the alkali cellulose and oxygen are removed in the washing step conducted subsequent to the etherifying reaction. However, excessive reduction in the degree of polymerization through the reaction between the alkali cellulose and oxygen makes it difficult to conduct washing in the washing step. This means that cellulose ether particles having a degree of polymerization excessively reduced are dense, thereby making it difficult to extract and remove the impurities from the inside of the particles, where the impurities include salts as a reaction by-product, by-product of the etherifying agent, and yellow substances. Moreover, the cellulose ether having a degree of polymerization excessively reduced dissolves or swells in a washing solvent, thereby causing a loss or interfering with smooth filtration in the filtering step.

When the ratio of viscosity reduction percentages is more than 8.0, a viscosity reduction percentage by the depolymerization with acid may be high. The cellulose ether after the second depolymerization with acid has a desired final degree of polymerization. When the viscosity at 20° C. of an aqueous 2% by weight solution is from 2 to 30 mPa·s, which is usually employed for coating of tablets, washing is made more difficult so that the cellulose ether having such a viscosity is usually provided as a final product without washing. Thus, a yellow substance generated at the time of depolymerization with acid remains in the product without being removed and tends to contribute to the yellowness of the product.

According to the present invention, the yellowing or discoloration of the final product can be minimized by optimizing a ratio of the first depolymerization through a reaction between an alkali cellulose and oxygen and the second depolymerization of the resulting cellulose ether with hydrochloric acid. Conducting both of the first and second depolymerizations with hydrochloric acid is not preferred because a yellow substance generated during the depolymerizations remains in the product without being removed and tends to contribute to the yellowness of the product. On the other hand, conducting both of the first and second depolymerizations with oxygen is also not preferred because a yellow substance generated during the depolymerizations becomes difficult to be removed in the washing step, remains in the product, and tends to contribute to the yellowness of the product.

EXAMPLES

Example 1

(a) Preparation of Hydroxypropylmethyl Cellulose (HPMC) without Depolymerization Wood pulp (degree of polymerization Dpw=2100) in chip form was immersed in an aqueous 44% by weight sodium hydroxide solution, followed by centrifugation to obtain an alkali cellulose. A weight ratio of the alkali metal hydroxide in the alkali cellulose to the solid component in the pulp was determined by the titration method and found to be 1.25. The resulting alkali cellulose (5.5 kg as the solid component in the pulp) was placed in a 100-L pressure-resistant reactor. After vacuuming, 11 kg of methyl chloride and 2.7 kg of propylene oxide were added thereto and reacted with the alkali cellulose. The reaction product was washed with hot water and then dried in a dryer using jacket heating and hot air heating in combination until the weight loss by drying reached 2% by weight. Then impact pulverization was conducted to obtain HPMC. With regard to the degree of substitution of the resulting HPMC as measured using the method of the Japanese Pharmacopoeia, DS was 1.90 and MS was 0.25. The viscosity at 20° C. of an aqueous 2% by weight solution thereof was 4000 mPa·s, which was the viscosity of the HPMC obtained without depolymerization.

(b) Preparation of HPMC by Depolymerization with Oxygen (First Depolymerization)

In the same manner as in the above (a), wood pulp (Dpw=2100) in chip form was immersed in an aqueous 44% by weight sodium hydroxide solution, followed by centrifugation to obtain an alkali cellulose. A weight ratio of the alkali metal hydroxide in the alkali cellulose to the solid component in the pulp was determined by the titration method and found to be 1.25. The resulting alkali cellulose (5.5 kg as the solid component in the pulp) was placed in a 100-L pressure-resistant reactor. The reactor was then aerated while being stirred. An aeration rate was 5.5 NL/min. Warm water was passed through the jacket of the reactor to heat the alkali cellulose therein. The temperature of the alkali cellulose was elevated from initial 35° C. to 70° C. after 40 minutes. The aeration was terminated 40 minutes later, and vacuuming was conducted immediately. After the vacuuming, 11 kg of methyl chloride and 2.7 kg of propylene oxide were added thereto and reacted with the alkali cellulose. The reaction product was washed with hot water and then dried in a dryer using jacket heating and hot air heating in combination until the weight loss by drying reached 2% by weight. Impact pulverization was then conducted to obtain HPMC. With regard to the degree of substitution of the resulting HPMC as measured using the method of the Japanese Pharmacopoeia, DS was 1.90 and MS was 0.25. The viscosity at 20° C. of an aqueous 2% by weight solution thereof was 340 mPa·s, which was the viscosity of the HPMC obtained by the depolymerization with oxygen. A viscosity reduction percentage by the depolymerization with oxygen was $(1-340/4000) \times 100 = 91.5\%$.

(c) Preparation of HPMC by Depolymerization with Acid (Second Depolymerization)

An 1 kg of the HPMC prepared by the depolymerization with oxygen was placed in a 20-L Henschel mixer and subjected to spraying of 12% by weight hydrochloric acid while being stirred for mixing at 200 rpm. The spraying amount was adjusted so that the amount of HCl was 0.3% by weight based on the amount of the HPMC. A 50 g of the resulting sprayed HPMC was transferred to a 500-ml glass reactor and was reacted for 60 minutes while rotating the reactor which was heated in a water bath of 80° C. Without changing the temperature, the reactor was kept under a reduced pressure of 60 mmHg for 60 minutes to evaporate the hydrogen chloride and the water. The residue was neutralized with sodium bicarbonate in a molar amount corresponding to a half of the added molar amount of HCl so as to obtain HPMC having a low degree of polymerization. The viscosity at 20° C. of an aqueous 2% by weight solution of the resulting HMPC determined by the method of the Japanese Pharmacopoeia was 6 mPa·s. A viscosity reduction percentage by the depolymerization with acid was $(1-6/340) \times 100 = 98.2\%$. A ratio of the viscosity reduction percentage by the depolymerization with acid to the viscosity reduction percentage by the depolymerization with oxygen was $98.2/91.5 = 1.07$.

The yellowness of an aqueous 2% by weight solution of the resulting HMPC was measured using an SM color computer "SM-4" (product of Suga Test Instruments) and found to be YI=10.

Example 2

HPMC was prepared in the same manner as in Example 1 except that a weight ratio of the alkali metal hydroxide in the alkali cellulose to the solid component in the pulp was 1.05, the resulting alkali cellulose (5.5 kg as the solid component in the pulp) was placed in a 100-L pressure-resistant reactor, and after vacuuming, 10 kg of methyl chloride and 1.3 kg of propylene oxide were added. With regard to the degree of substitution of the HPMC thus obtained as measured using the method of the Japanese Pharmacopoeia, DS was 1.80 and MS was 0.15. The results are shown in Table 1.

Example 3

The depolymerization with oxygen was conducted in the same manner as in Example 1 except that the aeration was terminated 12 minutes later in Example 1(b). The temperature of the alkali cellulose at the termination was 52° C. The depolymerization with acid was conducted in the same manner as in Example 1 except that the reaction time was changed to 70 minutes in Example 1(c). The results are shown in Table 1.

Example 4

The depolymerization with oxygen was conducted in the same manner as in Example 1 except that wood pulp in chip form having Dpw of 1550 was used and the aeration was terminated 70 minutes later in Example 1(b). The temperature of the alkali cellulose at the termination was 79° C. The depolymerization with acid was conducted in the same manner as in Example 1 except that the reaction time was changed to 50 minutes in Example 1(c). The results are shown in Table 1.

Example 5

The depolymerization with oxygen was conducted in the same manner as in Example 1 except that wood pulp in chip form having Dpw=4400 was used and the aeration was terminated 10 minutes later in Example 1(b). The temperature of the alkali cellulose at the termination was 50° C. The depolymerization with acid was conducted in the same manner as in Example 1 except that the reaction time was changed to 75 minutes in Example 1(c). The results are shown in Table 1.

Example 6

The depolymerization with acid was conducted in the same manner as in Example 1 except that in the reaction time was changed to 10 minutes Example 1(c). The results are shown in Table 1.

Example 7

The depolymerization with oxygen was conducted in the same manner as in Example 1 except that the aeration was terminated 12 minutes later in Example 1(b). The temperature of the alkali cellulose at the time of termination was 52° C. The depolymerization with acid was conducted in the same manner as in Example 1 except that the reaction time was changed to 12 minutes in Example 1(c). The results are shown in Table 1.

Example 8

The depolymerization with oxygen was conducted in the same manner as in Example 1 except that wood pulp in chip form having Dpw of 1550 was used and the aeration was terminated 70 minutes later in Example 1(b). The temperature of the alkali cellulose at the termination was 79° C. The depolymerization with acid was conducted in the same manner as in Example 1 except that the reaction time was changed to 7 minutes in Example 1(c). The results are shown in Table 1.

Example 9

The depolymerization with oxygen was conducted in the same manner as in Example 1 except that wood pulp in chip form having Dpw of 4400 was used and the aeration was terminated 10 minutes later in Example 1(b). The temperature of the alkali cellulose at the termination was 50° C. The depolymerization with acid was conducted in the same manner as in Example 1 except that the reaction time was changed to 14 minutes in Example 1(c). The results are shown in Table 1.

Comparative Example 1

Preparation of HPMC Only by Depolymerization with Oxygen

HPMC was prepared in the same manner as in Example 1(b) except that the temperature of the alkali cellulose was elevated from initial 35° C. to 97° C. after 100 minutes by heating the alkali cellulose and the aeration was terminated 100 minutes later. The results are shown in Table 1.

Comparative Example 2

Preparation of HPMC Only by Depolymerization with Acid

HPMC was prepared in the same manner as in Example 1(c) except that the HPMC obtained by the method of Example 1(a) was used as a raw material and HPMC was reacted with the acid for 75 minutes while rotating the reactor which was heated in a water bath of 80° C. The results are shown in Table 1.

TABLE 1

| | viscosity of HPMC | | | viscosity reduction percentage | | ratio of viscosity reduction percentages B/A | degree of yellowness after the second depolymerization |
|---|---|---|---|---|---|---|---|
| | no depolymerization (mPa·s) | after the first depolymerization (mPa·s) | after the second depolymerization (mPa·s) | by the first depolymerization A(%) | by the second depolymerization B(%) | | |
| Example 1 | 4000 | 340 | 6 | 91.5 | 98.2 | 1.07 | 10 |
| Example 2 | 4000 | 380 | 6 | 90.5 | 98.4 | 1.09 | 10 |
| Example 3 | 4000 | 3000 | 6 | 25.0 | 99.8 | 3.99 | 11 |
| Example 4 | 400 | 50 | 6 | 87.5 | 88.0 | 1.01 | 10 |
| Example 5 | 8000 | 7000 | 6 | 12.5 | 99.9 | 7.99 | 12 |
| Example 6 | 4000 | 340 | 15 | 91.5 | 95.6 | 1.04 | 5 |
| Example 7 | 4000 | 3000 | 15 | 25.0 | 99.5 | 3.98 | 6 |
| Example 8 | 400 | 50 | 15 | 87.5 | 70.0 | 0.80 | 5 |
| Example 9 | 8000 | 7000 | 15 | 12.5 | 99.8 | 7.98 | 7 |

* HPMC is an abbreviation of hydroxypropylmethyl cellulose.

The invention claimed is:

1. A method for preparing a cellulose ether having a low degree of polymerization, the method comprising:

a step of bringing pulp and an alkali metal hydroxide solution into contact with each other or mixing them to obtain a corresponding alkali cellulose, a first depolymerization step of reacting the alkali cellulose with oxygen to adjust a viscosity reduction percentage of the alkali cellulose to from 10 to 95% to obtain a depolymerized alkali cellulose, a step of reacting the depolymerized alkali cellulose with an etherifying agent to obtain a reaction product, a step of washing and drying the reaction product to obtain a cellulose ether of which an aqueous 2% by weight solution has a viscosity of from 30 to 10000 mPa·s, and a second depolymerization step of bringing the cellulose ether into contact with hydrochloric acid to adjust a viscosity reduction percentage of the cellulose ether to from 40 to 99.9%.

2. The method for preparing a cellulose ether having a low degree of polymerization according to claim 1, wherein a ratio of the viscosity reduction percentage in the second depolymerization step to the viscosity reduction percentage in the first depolymerization step is from 0.7 to 8.0.

3. The method for preparing a cellulose ether having a low degree of polymerization according to claim 2, wherein the cellulose ether is an alkyl cellulose, a hydroxyalkyl cellulose or a hydroxyalkylalkyl cellulose.

4. The method for preparing a cellulose ether having a low degree of polymerization according to claim 1, wherein the cellulose ether is an alkyl cellulose, a hydroxyalkyl cellulose or a hydroxyalkylalkyl cellulose.

* * * * *